(12) United States Patent
Abe et al.

(10) Patent No.: US 7,565,444 B2
(45) Date of Patent: Jul. 21, 2009

(54) COMMUNICATION SYSTEM

(75) Inventors: Yumiko Abe, Saijo (JP); Hiroaki Sato, Saijo (JP); Yoshinori Hosoe, Saijo (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 10/798,441

(22) Filed: Mar. 12, 2004

(65) Prior Publication Data

US 2004/0215822 A1  Oct. 28, 2004

(30) Foreign Application Priority Data

Mar. 13, 2003  (JP) ............ 2003-068652

(51) Int. Cl.
*G06F 15/173* (2006.01)
(52) U.S. Cl. ............ 709/238; 370/351
(58) Field of Classification Search ......... 709/238–240, 709/242; 370/351
See application file for complete search history.

(56) References Cited

U.S. PATENT DOCUMENTS 6,778,532 B1 * 8/2004 Akahane et al. ........... 370/392
6,917,978 B1 * 7/2005 Jinzaki ..................... 709/227

FOREIGN PATENT DOCUMENTS

| JP | 08097821 A | 4/1996 |
|----|------------|--------|
| JP | 08274777 A | 10/1996 |

* cited by examiner

*Primary Examiner*—Frantz B Jean
(74) *Attorney, Agent, or Firm*—Wenderoth, Lind & Ponack, L.L.P.

(57) ABSTRACT

In a communication system comprising plural communication terminals, each having a relay function, and a host having a relay function and a route control function, during route search, the communication terminal adds an ID of a self-terminal to a route search packet and broadcasts the packet. On receipt of a route search packet, the communication terminal adds a ID of the self-terminal to the received route search packet if the ID of the self-terminal is not yet added to the route search packet, and broadcasts the packet. The host obtains information of a route up to the communication terminal on a basis of the received route search packet, and notifies the communication terminal of the obtained route information.

2 Claims, 11 Drawing Sheets

| terminal ID | route | priority |
|---|---|---|
| G | F—C | 5 |
| G | F—C—B | 4 |
| G | E—B | 3 |
| G | E—C | 2 |
| G | E—C—B | 1 |

COMMUNICATION SYSTEM

FIELD OF THE INVENTION

The present invention relates to a communication system and, more particularly, to route control for a LAN (Local Area Network) comprising plural terminals.

DESCRIPTION OF THE RELATED ART

In a conventional communication system, communication between radio communication terminals beyond the reach of radio waves from each other has been carried out through access points or the like of the respective terminals.

To be specific, there has been a communication system in which communication is carried out through relay terminals as disclosed in, for example, Japanese Published Patent Application No. Hei. 8-274777. In this communication system, whether or not direct communication with a self-terminal is possible is checked with respect to each terminal, and the results are summarized to create, in the system, a correlation table showing whether or not direct communications between the respective terminals included in the system are possible. Then, a data sending station selects relay stations with reference to the correlation table, and sends a packet indicating relay route information, whereby communication can be carried out through the relay terminals.

Further, there has been another communication system in which communication can be carried out through relay terminals as disclosed in, for example, Japanese Published Patent Application No. Hei. 8-97821. This communication system employs a method of arranging communication terminals so that a portion of a radio-wave coverage area of a communication terminal overlaps a portion of a radio-wave coverage area of another communication terminal, obtaining information of a route up to a destination communication terminal by using a search packet, and adding the route information to a data packet to be transmitted. This communication system may also employ a method of arranging communication terminals so that a portion of a radio-wave coverage area of a communication terminal overlaps a portion of a radio-wave coverage area of another communication terminal, and repeating broadcasting a data packet.

However, the conventional communication system performing data communication through access points or the like takes much effort and cost for additional access points.

Further, in the communication system disclosed in Japanese Published Patent Application No. Hei. 8-274777, response confirmation to each terminal takes much time. Further, since the host terminal should previously recognize all terminals to perform response confirmation, IDs or the like of new terminals must be registered when increasing terminals.

On the other hand, in the communication system disclosed in Japanese Published Patent Application No. Hei. 8-97821, there is no host for controlling the whole network, and therefore, all of the communication terminals must control the routes to the other communication terminals, respectively. When a new terminal is introduced, all of the communication terminals must recognize the new terminal. Further, every time a data packet is transmitted, all of the communication terminals that have received the data packet broadcast the data packet, leading to an increase in traffic. Furthermore, since all of the terminals that have received the data packet can obtain the contents of data, security cannot be assured.

SUMMARY OF THE INVENTION

The present invention is made to solve the above-described problems and has for its object to provide a communication system that can carry out communication between terminals that are incapable of direct communication, without requiring setting of access points or registration of communication terminals.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a communication system comprising plural communication terminals each having a relay function, and a host having a relay function and a route control function, wherein, during a route search, the communication terminal adds an ID of a self-terminal to a route search packet and broadcasts the route search packet over an area where communication is possible. Further, on receipt of a route search packet, the communication terminal adds the ID of the self-terminal to the received route search packet if the ID of the self-terminal is not added to the route search packet, and broadcasts the route search packet over the area where communication is possible. In addition, the host obtains information of a route up to the communication terminal on the basis of the received route search packet, and notifies the communication terminal of the obtained route information. Therefore, it is possible to carry out communication between terminals without requiring setting of access points or registration of terminals that cannot directly communicate with each other.

According to a second aspect of the present invention, in the communication system according to the first aspect, the host obtains information of routes up to all of the communication terminals on the basis of the received route search packet. Therefore, it is possible to carry out communication between terminals without requiring setting of access points or registration of terminals that cannot directly communicate with each other.

According to a third aspect of the present invention, in the communication system according to the first aspect, during data communication, the communication terminal creates route information data on the basis of an ID of a destination terminal and IDs of relay terminals between the self-terminal and the host, and adds the route information data to a data packet to transmit the data packet to the host, and on receipt of a data packet, the communication terminal transfers the received data packet on the basis of route information data of the received data packet when a destination terminal of the received data packet is not the self terminal. Further, the host creates route information data between itself and the destination terminal on the basis of the route information data of the received data packet when the destination terminal of the received data packet is not the self-terminal, adds the destination terminal ID and the created route information data to the data packet, and transfers the data packet to the destination terminal. Therefore, it is possible to carry out communication between terminals without requiring setting of access points or registration of terminals that cannot directly communicate with each other.

According to a fourth aspect of the present invention, in the communication system according to the first aspect, the IDs are IP addresses. Therefore, it is possible to carry out communication between terminals without requiring setting of access points or registration of terminals that cannot directly communicate with each other.

According to a fifth aspect of the present invention, in the communication system according to the first aspect, the IDs are MAC addresses. Therefore, it is possible to carry out communication between terminals without requiring setting of access points or registration of terminals that cannot directly communicate with each other.

According to a sixth aspect of the present invention, in the communication system according to the first aspect, the IDs are specific codes. Therefore, it is possible to carry out communication between terminals without requiring setting of access points or registration of terminals that cannot directly communicate with each other.

According to a seventh aspect of the present invention, in the communication system according to the first aspect, the host and the communication terminal obtain data indicating the communication state between the self-terminal and a packet transmission source terminal, and add the data indicating the communication state to the route search packet. In addition, the host selects an optimum route on the basis of the data indicating the communication state. Therefore, it is possible to carry out communication with efficiency.

According to an eighth aspect of the present invention, in the communication system according to the seventh aspect, the data indicating the communication state is the type of media. Therefore, it is possible to carry out communication with efficiency.

According to a ninth aspect of the present invention, in the communication system according to the seventh aspect, the data indicating the communication state is the error rate. Therefore, it is possible to carry out communication with efficiency.

According to a tenth aspect of the present invention, in the communication system according to the seventh aspect, the data indicating the communication state is the reception sensitivity. Therefore, it is possible to carry out communication with efficiency.

According to an eleventh aspect of the present invention, in the communication system according to the first aspect, the host creates pattern information of route having a specific communication terminal as a relay terminal on the basis of the route information obtained during route search, and notifies each communication terminal of the created pattern information at arbitrary timing or periodically. Further, on receipt of a data packet, the host transfers the received data packet on the basis of pattern information of the data packet when the destination terminal of the data packet is not the self-terminal. Also, the communication terminal adds, to a data packet, pattern information of route up to an arbitrary communication terminal, and transmits the data packet, and, on receipt of a data packet, the communication terminal transfers the received data packet on the basis of the pattern information of the data packet when the destination terminal of the data packet is not the self-terminal. Therefore, the size of the header of the data packet does not change even when the number of relay terminals increases, thereby preventing the error rate from increasing due to an increase in the packet length.

According to a twelfth aspect of the present invention, in the communication system according to the first aspect, when there are plural routes to one communication terminal, the host assigns priorities to the respective routes, and stores a database in which the priorities of the respective routes are entered. In addition, during data communication, the communication terminal and the host try to communicate with each other through a route of the highest priority among the routes entered in the database of the host. Also, when the communication fails, the communication terminal and the host try to communicate again through a route of the second highest priority. Therefore, even when the communication route is interrupted due to temporary deterioration in radio wave condition or the like or is changed due to rearrangement of terminals or the like, the communication route can be rapidly switched to a route of the second highest priority.

According to a thirteenth aspect of the present invention, in the communication system according to the twelfth aspect, when data communication is not carried out, the host investigates the routes entered in the database, and updates the route information entered in the database on the basis of the results of the route investigation and data communication. Therefore, even when the communication state changes, a new communication route can be rapidly established.

According to a fourteenth aspect of the present invention, in the communication system according to the twelfth aspect, the host assigns priorities on the basis of the time taken until the packet arrives. Therefore, even when the communication route is interrupted due to temporary deterioration in radio wave condition or the like or is changed due to rearrangement of terminals or the like, the communication route can be rapidly switched to a route of the second highest priority.

According to a fifteenth aspect of the present invention, in the communication system according to the twelfth aspect, the host assigns priorities on the basis of the number of relay terminals. Therefore, even when the communication route is interrupted due to temporary deterioration in radio wave condition or the like or is changed due to rearrangement of terminals or the like, the communication route can be rapidly switched to a route of the second highest priority.

According to a sixteenth aspect of the present invention, in the communication system according to the twelfth aspect, the host assigns priorities on the basis of the error rate. Therefore, even when the communication route is interrupted due to temporary deterioration in radio wave condition or the like or is changed due to rearrangement of terminals or the like, the communication route can be rapidly switched to a route of the second highest priority.

According to a seventeenth aspect of the present invention, in the communication system according to the twelfth aspect, the host assigns priorities on the basis of the type of media. Therefore, even when the communication route is interrupted due to temporary deterioration in radio wave condition or the like or is changed due to rearrangement of terminals or the like, the communication route can be rapidly switched to a route of the second highest priority.

According to an eighteenth aspect of the present invention, there is provided a communication system comprising plural communication terminals each having a relay function, and a host having a relay function and a route control function, wherein, during route search, the communication terminal adds an ID of the self-terminal to a route search packet, and broadcasts the packet over an area where communication is possible. Also, on receipt of a route search packet, the communication terminal adds the ID of the self-terminal if it is not added to the received route search packet, and broadcasts the packet over the area where communication is possible. Further, the host obtains information of route up to the communication terminal and information of routes between the respective terminals, and notifies the communication terminal of the obtained route information. Therefore, needless routing is avoided, leading to a reduction in traffic and error.

According to a nineteenth aspect of the present invention, there is provided a communication system comprising plural communication terminals each having a relay function, and a host having a relay function and a route control function, wherein, during route search, the communication terminal adds an ID of the self-terminal to a route search packet and broadcasts the packet. In addition, on receipt of a route search packet, the communication terminal obtains information of route up to the host and information of route between the self-terminal and another communication terminal, and notifies the host of the obtained route information. Also, the host stores the route information notified from the communication terminal into the database. Therefore, it is not necessary for the host to calculate route information of all terminals, leading to a reduction in processing load on the host. Further, even when a part of a route is changed, partial search can be carried out, leading to a reduction in traffic.

According to a twelfth aspect of the present invention, in the communication system according to the eighteenth or nineteenth aspect, during data communication, the communication terminal obtains, from the host, route information including information of communication terminals that serve as relay terminals in data transmission to a destination terminal, and adds an ID of the destination terminal and IDs of the relay terminals between the self-terminal and the destination terminal to the data packet to transmit the data packet. Moreover, on receipt of a data packet, the communication terminal transfers the received data packet to a next destination terminal on the basis of the route information obtained from the host when the destination terminal of the received data packet is not the self-terminal. Therefore, needless routing is avoided, leading to a reduction in traffic and error.

DETAILED DESCRIPTION OF THE INVENTION

Embodiment 1

Figure 1:
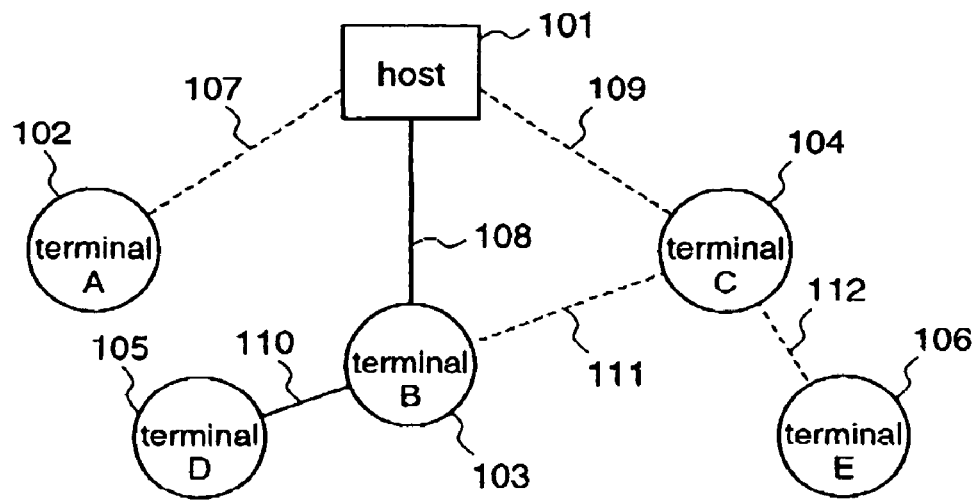
FIG. 1 is a block diagram illustrating a communication system according to a first embodiment of the present invention.

FIG. 1 is a block diagram illustrating a communication system according to a first embodiment of the present invention.

As shown in FIG. 1, the communication system according to the first embodiment has both of a cable communication function and a radio communication function. The communication system comprises a host 101 that controls the whole communication system so as to carry out smooth communication, terminals A102, C104, and E106 having radio communication functions, a terminal D105 having a cable communication function, and a terminal B103 having both of a radio communication function and a cable communication function. The host and the respective terminals are able to communicate through radio communication routes 107, 109, 111, and 112 and cable communication routes 108 and 110.

Figure 2:
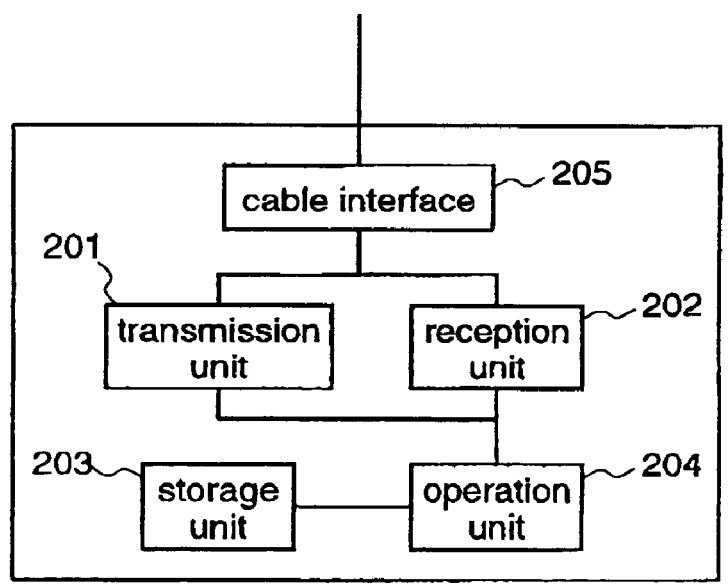
FIG. 2 is a block diagram illustrating a cable communication terminal of the communication system according to the first embodiment.

FIG. 2 is a block diagram illustrating the cable communication terminal (terminal D) in the communication system according to the first embodiment.

As shown in FIG. 2, the terminal D comprises a transmission unit 201 for transmitting packets, a reception unit 202 for receiving packets, a storage unit 203 for holding a processing program or the like, an operation unit 204 for executing the processing program stored in the storage unit 203, and a cable interface 205 for transmitting/receiving packets by cable communication.

Figure 3:
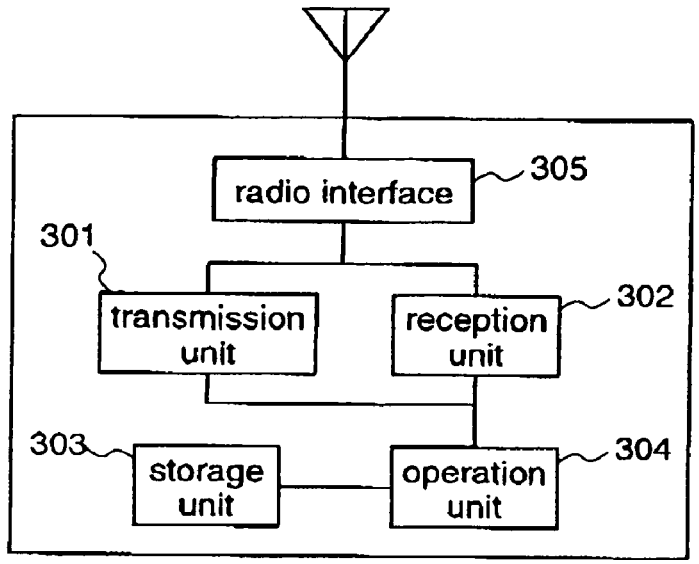
FIG. 3 is a block diagram illustrating a radio communication terminal of the communication system according to the first embodiment.

FIG. 3 is a block diagram illustrating the radio communication terminal (terminal A, C, or E) in the communication system according to the first embodiment.

As shown in FIG. 3, each of the terminals A, C, and E comprises a transmission unit 301, a reception unit 302, a storage unit 303, and an operation unit 304 which are identical to those of the terminal D shown in FIG. 2, and further, a radio interface 305 for transmitting/receiving packets by radio communication.

Figure 4:
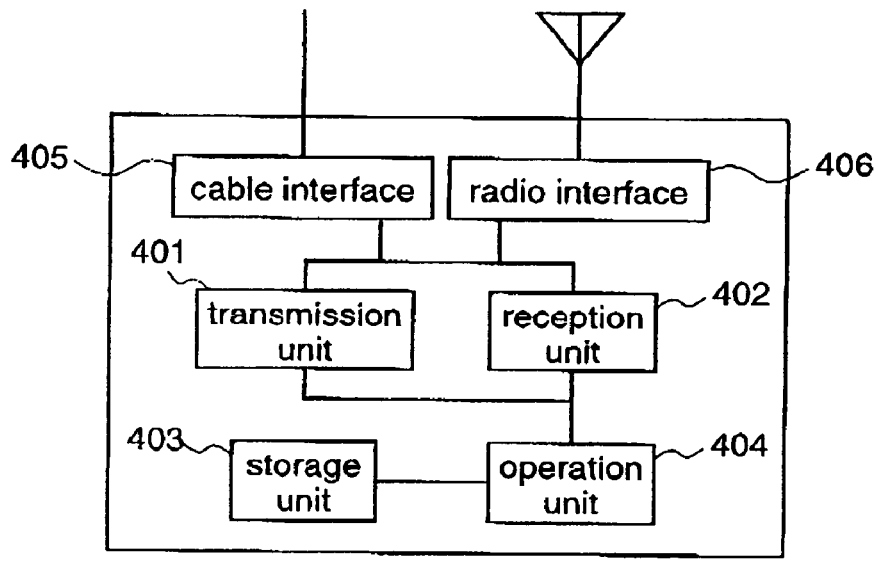
FIG. 4 is a block diagram illustrating a cable and radio communication terminal of the communication system according to the first embodiment.

FIG. 4 is a block diagram illustrating the cable and radio communication terminal (host or terminal B) in the communication system according to the first embodiment.

As shown in FIG. 4, each of the host and the terminal B comprises a transmission unit 401, a reception unit 402, a storage unit 403, an operation unit 404, a cable interface 405, and a radio interface 406 which are identical to those of the terminals A, C, D, and E shown in FIG. 2 or 3, and is able to communicate with both of the cable communication terminal and the radio communication terminal.

Figure 5:
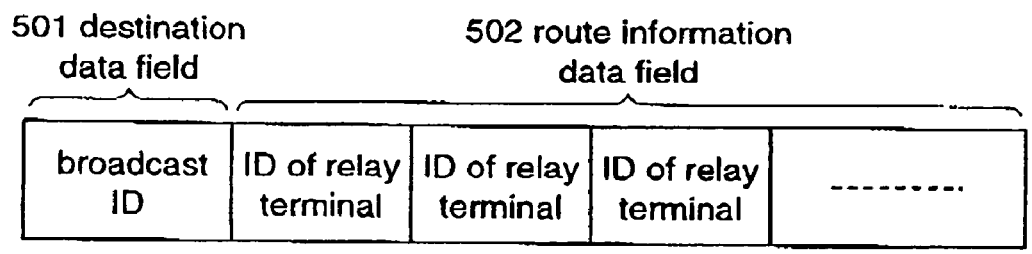
FIG. 5 is a diagram illustrating the construction of a route search packet of the communication system according to the first embodiment.

FIG. 5 is a diagram illustrating the structure of a route search packet of the communication system according to the first embodiment.

As shown in FIG. 5, the route search packet comprises a destination data field 501 in which a broadcast ID showing "broadcast" is added, and a route information data field 502 in which IDs of relay terminals are successively added. Since IDs as many as the relay terminals are added to the route information data field 502, the length of the field is variable. Standard IDs such as IP addresses or MAC addresses may be employed, or IDs based on an original protocol may be employed.

Figure 6:
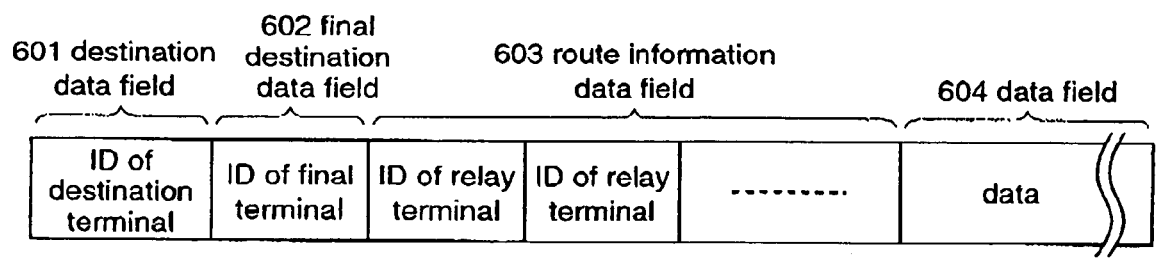
FIG. 6 is a diagram illustrating the construction of a data packet of the communication system according to the first embodiment.

FIG. 6 is a diagram illustrating the structure of a data packet of the communication system according to the first embodiment.

As shown in FIG. 6, the data packet comprises a destination data field 601 in which an ID of a destination terminal is added, a final destination data field 602 in which an ID of a final terminal to which the data packet should finally be sent is added, a route information data field 603 in which IDs of terminals that relay the data packet to the final terminal are successively added in order of relay, and a data field 604 in which data, such as video data and audio data, are added. The IDs used in the data packet are identical to the IDs shown in FIG. 5.

Hereinafter, the operation of the communication system according to the first embodiment will be described.

During route search, one of plural terminals (e.g., a new terminal introduced) broadcasts a route search packet. When the other terminals receive the route search packet, each terminal adds its own ID to the packet, and broadcasts the packet. Then, the host recognizes routes on the basis of the route search packets received, and enters an optimum route into a database that is stored in the storage unit, and further, notifies each terminal of the route from the terminal to the host.

During data communication, each terminal transmits a data packet to the host on the basis of the route information, and the host transmits the data packet to the target terminal on the basis of the route information.

Hereinafter, the packet reception processing between the terminals and the host will be described in detail.

Figure 7:
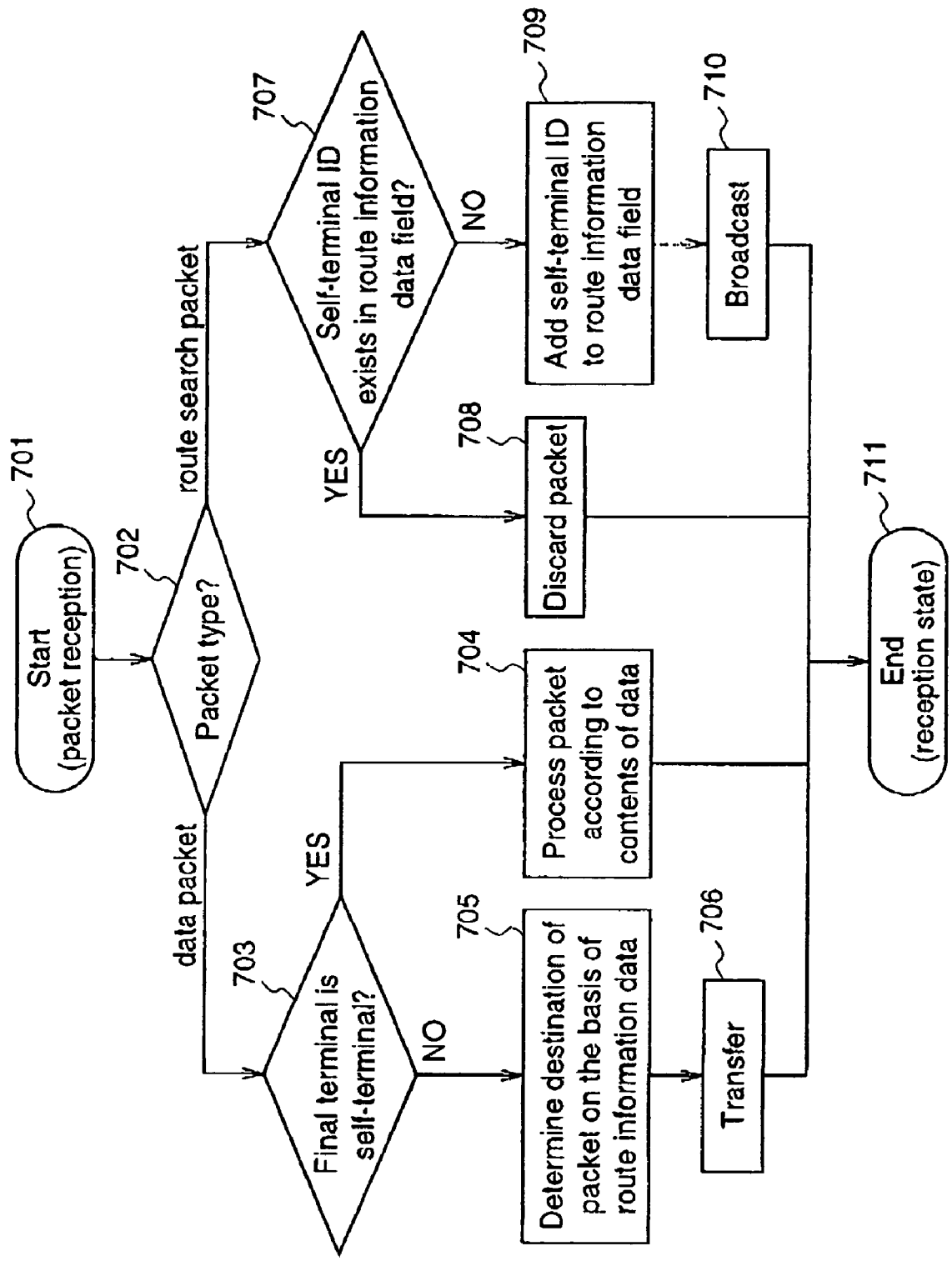
FIG. 7 is a flowchart illustrating packet reception processing by each terminal in the communication system according to the first embodiment.

FIG. 7 is a flowchart illustrating the packet reception processing of each terminal in the communication system according to the first embodiment.

When a terminal receives a packet (step 701), the terminal judges whether the received packet is a route search packet or a data packet (step 702). At this time, the terminal may judge the packet type according to whether or not the packet is a broadcast packet, or it may judge the packet type from the ID added to the packet.

When it is judged that the packet type is a data packet, the terminal judges whether or not the final terminal is the self-terminal (step 703). When the final terminal is the self-terminal, the terminal performs processing according to the contents of data (step 704), and returns into the reception state (step 711). When the final terminal is another terminal, the terminal adds, to the packet, the ID of the next terminal to which the packet should be sent, as a destination ID, on the basis of the route information data added to the packet (step 705), and transmits the packet (step 706), and then returns into the reception state (step 711).

When it is judged in step 702 that the packet type is a route search packet, the terminal judges whether the ID of the self-terminal has already been added to the route information data field of the packet (step 707). When the ID of the self-terminal has already been added to the route information data field, the terminal discards the packet (step 708), and returns into the reception state (step 711). Thereby, an endless route search can be avoided. Further, when the ID of the self-terminal is not added to the route information data field of the packet, the terminal adds the ID of the self-terminal to the route information data field (step 709), and broadcasts the packet (step 710), and then returns into the reception state (step 711).

Figure 8:
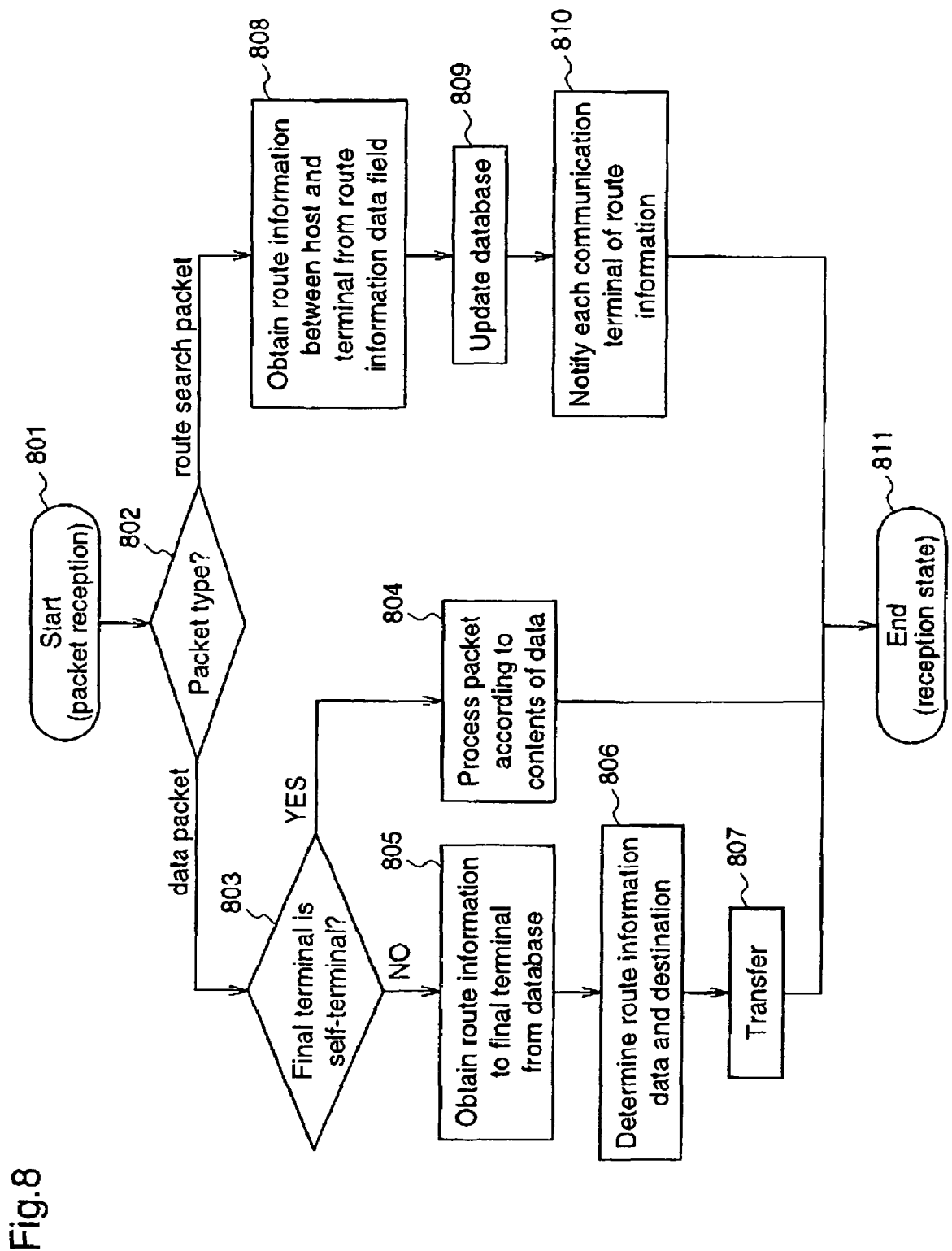
FIG. 8 is a flowchart illustrating packet reception processing by a host in the communication system according to the first embodiment.

FIG. 8 is a flowchart illustrating the packet reception processing of the host in the communication system according to the first embodiment.

When the host receives a packet (step 801), the host judges whether the received packet is a route search packet or a data packet (step 802). At this time, the host may judge the packet type according to whether or not the packet is a broadcast packet, or it may judge the packet type from the ID added to the packet.

When it is judged that the packet type is a data packet, the host judges whether or not the final terminal is the self-terminal (step 803). When the final terminal is the self-terminal, the host performs processing according to the contents of data (step 804), and returns into the reception state (step 811). When the final terminal is another terminal, the host obtains information of a route up to the final terminal from the database in which the information of the routes between the host and the respective terminals is stored (step 805), adds the route information data to the route information data field and adds the ID of the next terminal to which the packet should be sent, to the destination data field (step 806), transmits the packet (step 807), and returns into the reception state (step 811).

When it is judged in step 802 that the packet type is a route search packet, the host obtains information of route between the terminal and the host from the route information data field added to the packet (step 808), updates the database if the route is not yet entered in the database or the route is more appropriate than the already entered routes (step 809), notifies the respective terminals of the route information (step 810), and returns into the reception state (step 811).

As described above, in the communication system according to the first embodiment, during route search, a terminal as a transmission source broadcasts a route search packet to which its own ID is added. When each terminal receives the route search packet and judges that its own ID has already been added to the packet, the terminal discards the packet. Otherwise, the terminal adds its own ID to the packet and broadcasts the packet. When the host receives the route search packet, the host obtains information of a route from each terminal to the host, and stores the route information in the database or updates the route information. Then, the host notifies each terminal of the route information. During data transmission, each terminal transmits a data packet to the host on the basis of the route information notified from the host. On receipt of the data packet, the host transmits the data packet to the target terminal on the basis of the route information stored in the database. Therefore, communication can be carried out between terminals which are incapable of direct communication, without requiring setting of access points or registration of terminals. Further, even when a new terminal is introduced, route search for the new terminal can be carried out with efficiency.

Embodiment 2

The construction of a communication system according to a second embodiment is identical to that of the communication system shown in FIGS. 1 to 4. In this second embodiment, the host and each terminal transmit/receive a route search packet shown in FIG. 9.

Figure 9:
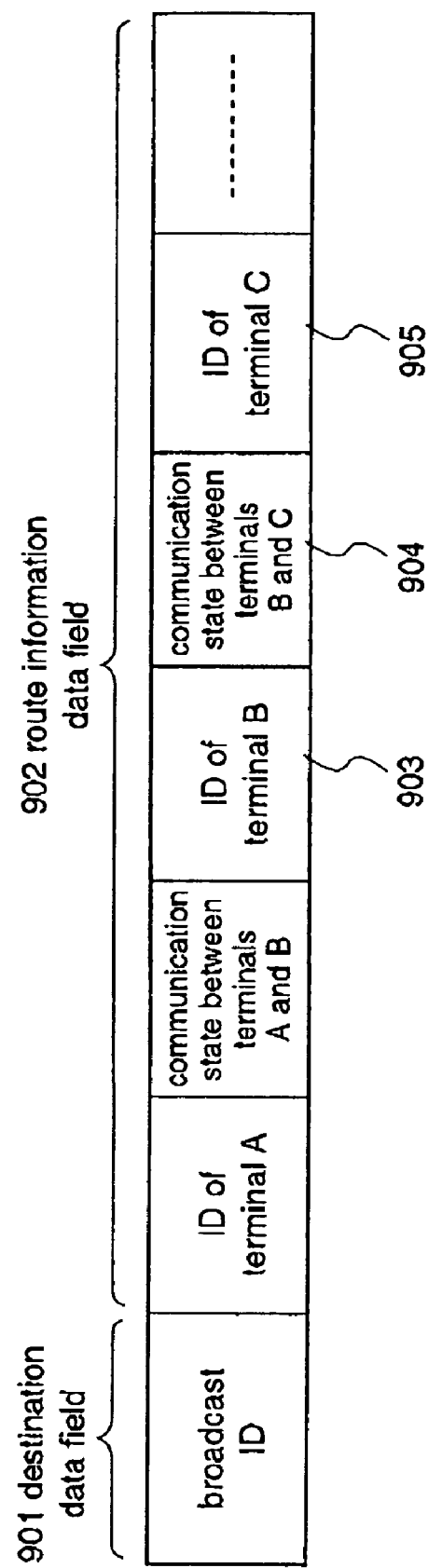
FIG. 9 is a diagram illustrating the construction of a route search packet in a communication system according to a second embodiment of the present invention.

FIG. 9 is a diagram illustrating a route search packet of the communication system according to the second embodiment.

As shown in FIG. 9, the route search packet according to the second embodiment comprises a destination data field 901 that is identical to the destination data field shown in FIG. 5, and a route information data field 902 in which data indicating the communication state between terminals is added between IDs of relay terminals. In the route information data field 902, after passing through terminals A and B, a terminal C adds data 904 indicating the communication state between the terminals B and C to the end of the ID 903 of the terminal B and, thereafter, adds the ID 905 of the self-terminal. The data showing the communication state includes, for example, the type of communication media between terminals such as cable or radio, the error rate, the reception sensitivity, and the like. It is assumed that the communication state shown in FIG. 9 includes three kinds of data, i.e., the type of media, the inter-terminal error rate, and the inter-terminal reception sensitivity.

Hereinafter, the operation of the communication system according to the second embodiment will be described.

During route search, one of plural terminals (e.g., a new terminal introduced) broadcasts a route search packet. When the other terminals receive the route search packet, each terminal adds, to the packet, its own ID and data indicating the communication state with the previous terminal, and broadcasts the packet. Then, the host recognizes the routes on the basis of the route search packets received, and selects an optimum route on the basis of the communication state added to the route search packet when plural routes exist between two terminals, and enters the optimum route into the database that is stored in the storage unit, and further, notifies each terminal of the route from the terminal to the host.

During data communication, each terminal transmits a data packet to the host on the basis of the route information notified by the host, and the host that has received the data packet transmits the data packet to the target (destination) terminal on the basis of the route information.

The method of selecting the optimum route by the host will be described in detail.

Figure 10:
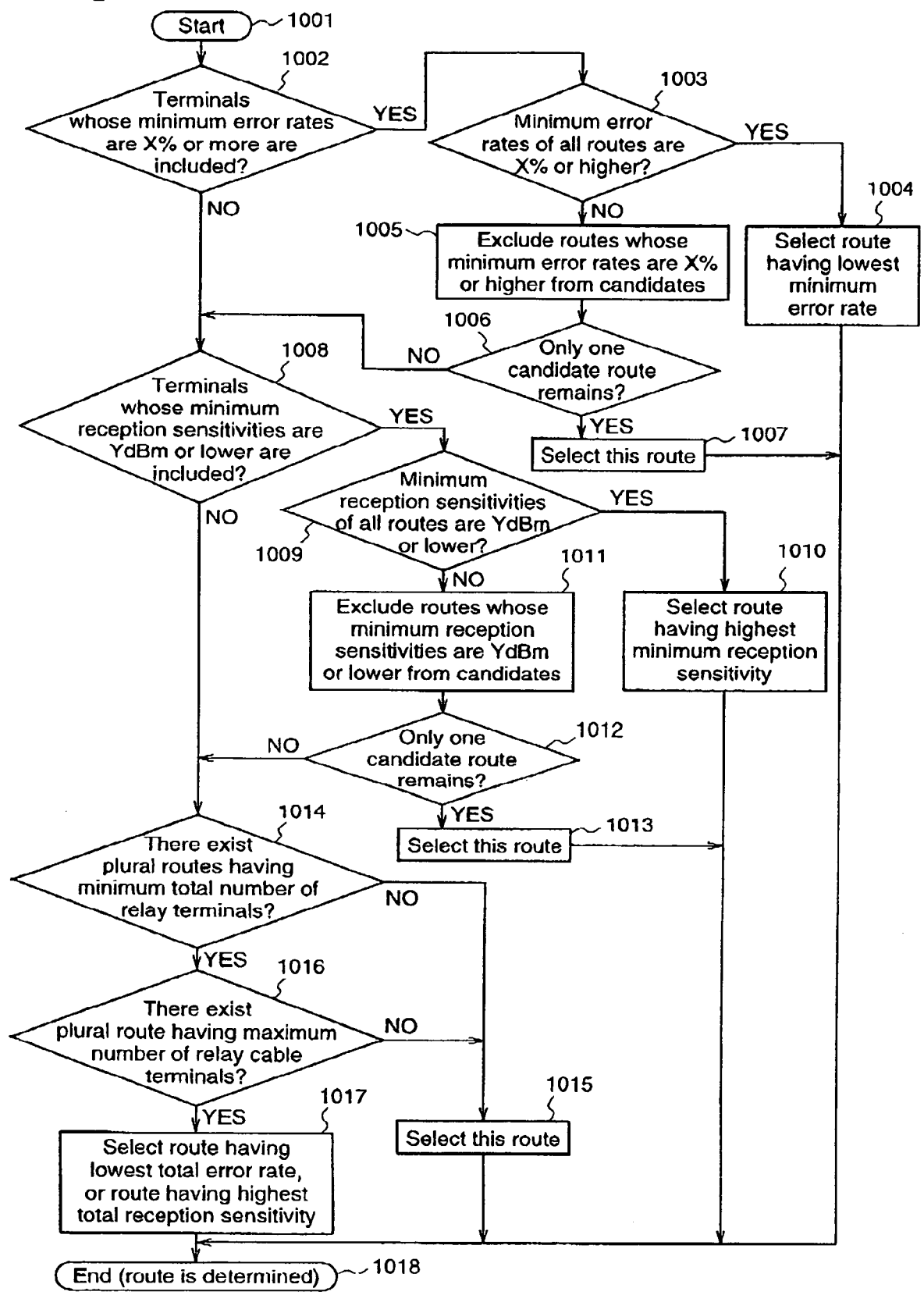
FIG. 10 is a flowchart illustrating packet reception processing by a host in the communication system according to the second embodiment.

FIG. 10 is a flowchart illustrating the packet reception processing of the host in the communication system according to the second embodiment. In this second embodiment, the error rate being lower than a threshold value is expressed by that the threshold value of the error rate is satisfied, and the reception sensitivity being higher than a threshold value is expressed by that the threshold value of the reception sensitivity is satisfied.

Initially, it is judged whether or not the minimum error rate between terminals in each route satisfies a predetermined threshold value (X %) (step 1002). When the judgement in step 1002 is that there are some routes in which the minimum error rate does not satisfy the threshold value, it is judged whether or not the some routes correspond to all routes (step 1003). When the judgement in step 1003 is that the some routes correspond to all routes, a route having the lowest minimum error rate is selected from among the routes (step 1004), and the route selection is ended (step 1018). When the judgement in step 1003 is that the some routes are not all routes, the routes that do not satisfy the threshold value are excluded from the candidates (step 1005). When there remains only one candidate route (step 1006), the route is selected (step 1007) to end the route selection (step 1018).

When the judgement in step 1002 is that there is no route in which the minimum error rate does not satisfy the threshold value or when the number of remaining candidate routes is larger than one in step 1006, it is judged whether or not there is any route in which the minimum reception sensitivity between terminals does not satisfy a predetermined threshold value (YdBm) (step 1008). When the judgement in step 1008 is that there are some routes in which the minimum reception sensitivity does not satisfy the threshold value, it is judged whether the some routes correspond to all routes or not (step 1009). When the judgement in step 1009 is that the some routes are not all routes, a route having the highest minimum reception sensitivity is selected from among the routes (step 1010) to end the route selection (step 1018). When the judgement in step 1009 is that the some routes are not all routes, the routes that do not satisfy the threshold value are excluded from the candidates (step 1011). When there remains only one candidate route (step 1012), the route is selected (step 1013) to end the route selection (step 1018).

When the judgement in step 1008 is that there is no route in which the minimum reception sensitivity does not satisfy the threshold value or when the number of remaining candidate routes is more than one, the routes (remaining routes) are compared with respect to the total number of relay terminals (step 1014). When there is only one route having the smallest total number of relay terminals, the route is selected (step 1015) to end the processing (step 1018). When there are plural routes having the smallest total number of relay terminals, the routes are compared with respect to the number of relay cable communication terminals (step 1016). When there is only one route having the largest total number of cable communication terminals, the route is selected (step 1015) to end the route selection (step 1018). When there are plural routes having the largest total number of relay cable communication terminals, a route having the lowest total error rate or a route having the highest total reception sensitivity is selected (step 1017) to end the route selection (step 1018).

As described above, in the communication system according to the second embodiment, during route selection, each terminal adds, to a route selection packet, data indicating the communication state from a terminal that broadcast the route selection packet to the self-terminal, and broadcasts the route selection packet. On receipt of the route selection packet to which the data indicating the communication state is added, the host obtains information of a route from each terminal to the host. When plural routes exist between one terminal and the host, the host selects an optimum route on the basis of the communication state of the route. Therefore, communication can be efficiently carried out through the optimum route.

Embodiment 3

Figure 11:
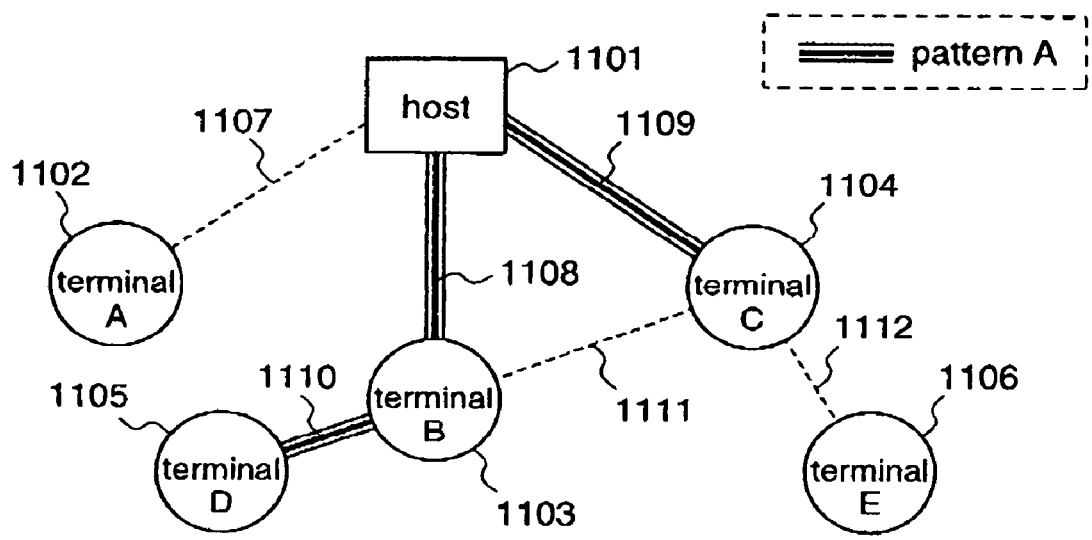
FIG. 11 is a block diagram illustrating a communication system according to a third embodiment of the present invention.

FIG. 11 is a block diagram illustrating a communication system according to a third embodiment of the present invention.

As shown in FIG. 11, the communication system according to the third embodiment comprises a host 1101 having both of cable communication function and radio communication function, a terminal A 1102, a terminal C 1104, and a terminal E 1106 having radio communication function, a terminal D 1105 having cable communication function, and a terminal B 1103 having both of radio communication function and cable communication function. The host and the respective terminals can communicate through radio communication routes 1107, 1109, 1111, and 1112, and cable communication routes 1108 and 1110. The host and the respective terminals having the same constructions as those shown in FIGS. 2 to 4.

Figure 12:
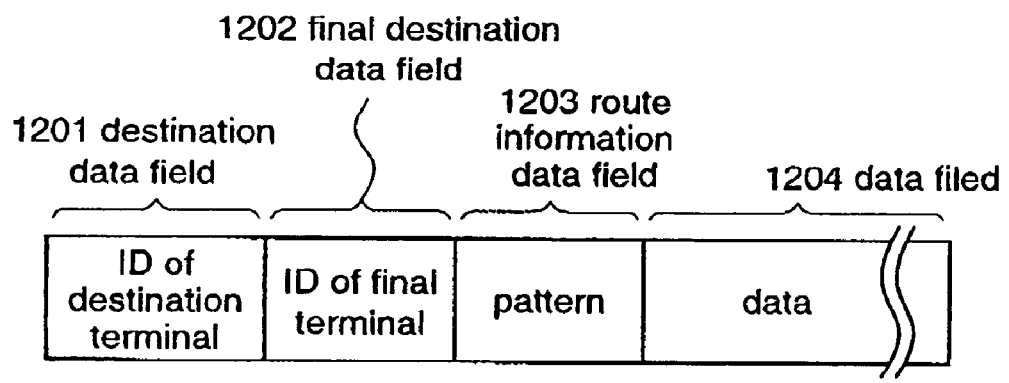
FIG. 12 is a diagram illustrating the construction of a data packet in the communication system according to the third embodiment.

FIG. 12 is a diagram illustrating the structure of a data packet of the communication system according to the third embodiment.

As shown in FIG. 12, the data packet comprises a destination data field 1201 in which an ID of a destination terminal is added, a final destination data field 1202 in which an ID of a final terminal to which the data packet should be sent finally is added, a route information data field 1203 in which route pattern information is added, and a data field 1204 to which data such as video data and audio data are added. Standard IDs such as IP addresses or MAC addresses may be employed, or IDs based on an original protocol may be employed.

Hereinafter, the operation of the communication system according to the third embodiment will be described.

During a route search, the host 1101 previously patterns a route having a high frequency of use, and stores the pattern information into the storage unit and transmits it to all the terminals. For example, assuming that the frequency of communication from the terminal D 1105 through the terminals B 1103 and the host 1101 to the terminal C 1104 is high, the host 1101 determines the communication routes 1110, 1108, and 1109 as a pattern A, and stores this pattern in the storage unit and, simultaneously, transmits it to all the terminals. Each terminal stores the received pattern information in the storage unit. It is not necessary to provide separated patterns for an upper route and a lower route because each route is recognized to be an upper route or a lower route by considering which terminal has transmitted the packet.

During data communication, each terminal adds a desired pattern information to the route information data field 1203, and transmits the data packet on the basis of the pattern information. The relay terminal compares the pattern information held by the self-terminal with the pattern added to the route information field 1203, determines an ID of a terminal to which the packet should be transmitted next on the basis of the pattern information of the self-terminal, adds the ID to the destination data field 1201, and transmits the data packet.

As described above, in the communication system according to the third embodiment, during the route search, the host previously patterns the information of the relay routes and stores the pattern in the storage unit, and then informs it to all of the terminals. During data transmission, each terminal adds not the all relay route information but the route pattern information to the data packet, and transmits the packet. Then, the relay terminal checks the pattern information that is added to the data packet stored in the self-terminal to determine a terminal to which the data packet should be transmitted next, and adds the pattern information to the data packet to be transmitted. Therefore, the size of the header of the data packet does not change even when the number of relay terminals increases, thereby preventing the error rate from increasing due to an increase in the packet length.

Embodiment 4

Figures 13, 14:
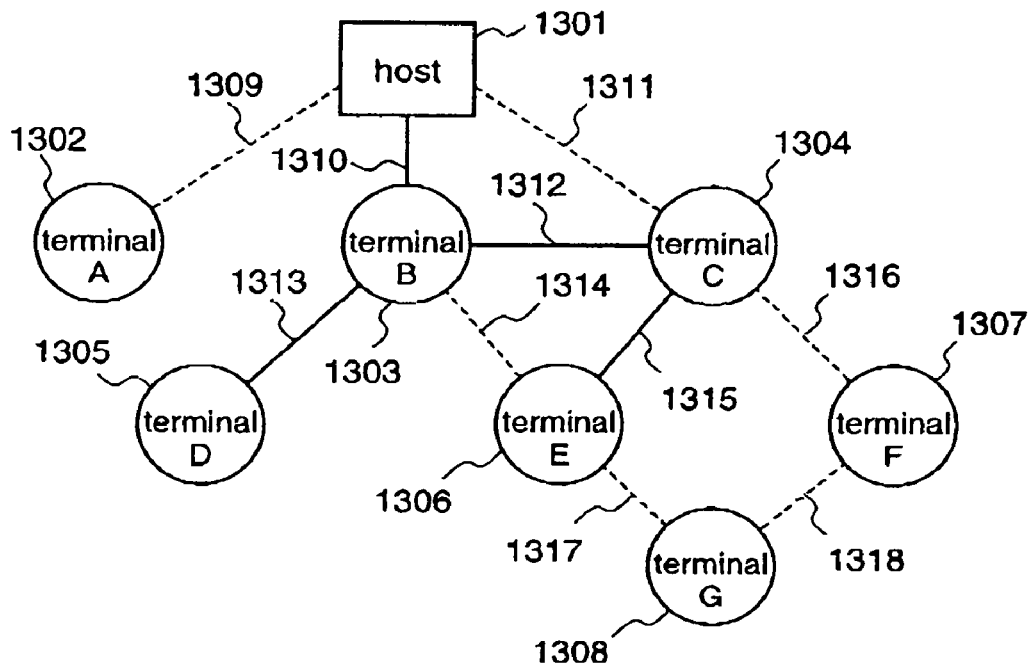
FIG. 13 is a block diagram illustrating a communication system according to a fourth embodiment of the present invention.
FIG. 14 is a diagram illustrating a database stored in a host of the communication system according to the fourth embodiment.

FIG. 13 is a block diagram illustrating a communication system according to a fourth embodiment of the present invention.

As shown in FIG. 13, the communication system according to the fourth embodiment comprises a host 1301 having both of cable communication function and radio communication function, a terminal A 1302, a terminal F 1307, and a terminal G 1308 having radio communication function, a terminal D 1305 having cable communication function, and a terminal B 1303, a terminal C 1304, and a terminal E 1306 having both of radio communication function and cable communication function. The host and the respective terminals can communicate through cable communication routes 1310, 1312, 1313, and 1315, and radio communication routes 1309, 1311, 1314, 1316, 1317, and 1318. The terminal D 1305 has the same construction as the cable communication terminal shown in FIG. 2, the terminals A 1302, F 1307, and G 1308 have the same construction as the radio communication terminal shown in FIG. 3, and the host and the terminals B 1303, C 1304, and E 1306 having the same construction as the cable and radio communication terminal shown in FIG. 4.

FIG. 14 is a diagram illustrating a database stored in the host of the communication system according to the fourth embodiment.

As shown in FIG. 14, the database contains the ID of the destination terminal 1401, the route information data 1402, and the priority 1403 of the respective routes. FIG. 14 shows the information of route between the host 1301 and the terminal G 1308.

Hereinafter, the operation of the communication system according to the fourth embodiment will be described.

During route search, the host recognizes the communication states between the respective terminals, such as the time required until the route search packet arrives, the number of relay terminals, the error rate, and whether or not the packet passes the cable terminal. When there are plural routes between one terminal and the host, the host assigns priorities to the routes on the basis of these data, and stores the terminal ID 1401, the route information data 1402, and the priority 1403 in the database.

During data communication, the host refers to the priority data 1403, picks up the route information data 1402 having the highest priority, and performs communication through this route. When a communication error occurs in the route, the host refers to the priority data 1403 again, picks up the route information data of the second highest priority, and performs communication through this route. Further, each terminal obtains the priority information from the host, and tries communication through a route having the highest priority, as described above.

As described above, in the communication system according to the fourth embodiment, when there are plural routes between the host and a terminal, the host assigns priorities to the respective routes and stores them in the data base. During data communication, the host performs communication through a route that is available and has the highest priority. Therefore, even when the communication route is (i) interrupted due to temporary deterioration in the radio wave condition or (ii) changed due to rearrangement of the terminals or the like, the communication route can be rapidly switched to the route having the second highest priority.

The communication route is checked during the standby state where no data communication is carried out, and the data base may be updated if there is a change. Thereby, a new communication route can be rapidly established even when the communication condition changes.

Embodiment 5

The construction of a communication system according to the fifth embodiment is identical to the communication system shown in FIGS. 1 to 4.

During route search, the host obtains information of route between adjacent terminals, and enters the route information in the data base.

Figure 15:
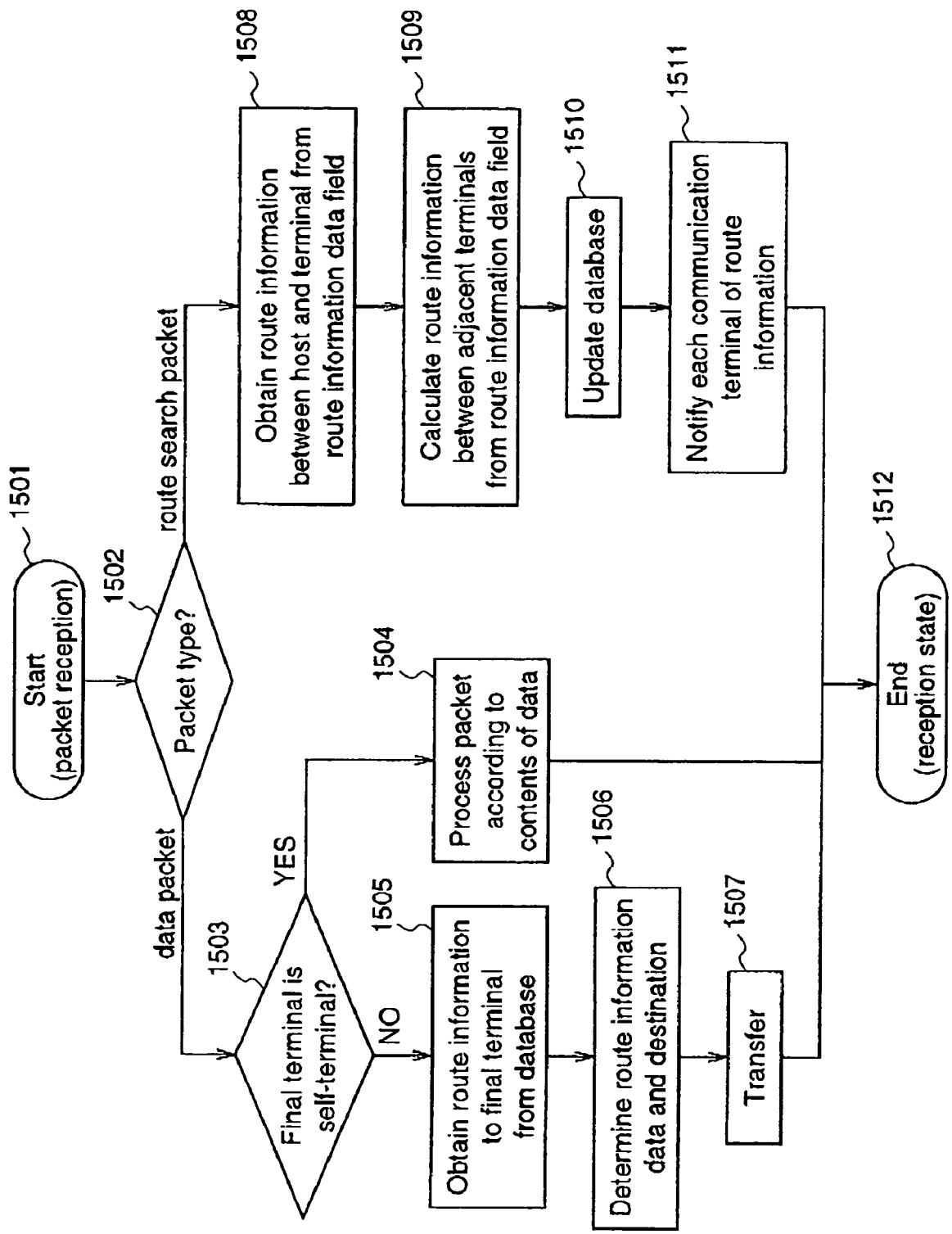
FIG. 15 is a flowchart illustrating packet reception processing by the host in a communication system according to a fifth embodiment of the present invention.

FIG. 15 is a flowchart illustrating the packet reception processing of the host of the communication system according to the fifth embodiment.

When the host receives a packet (step 1501), the host judges whether the received packet is a route search packet or a data packet (step 1502). At this time, the host may judge the packet type according to whether or not the packet is a broadcast packet, or the host may judge the packet type from the ID that is added to the packet and indicates the packet type.

When the packet type is a data packet, the host judges whether or not the final terminal is the self-terminal (step 1503). When the final terminal is the self-terminal, the host performs processing according to the contents of data (step 1504), and returns to the reception state (step 1512). When the final terminal is another terminal, the host obtains information of route up to the final terminal from the data base where the information of routes between the host and the respective terminals is stored (step 1505), adds the route information data to the route information data field, adds the ID of the next terminal in the destination data field (step 1506), performs transmission (step 1507), and returns to the reception state (step 1512).

When the judgement in step 1502 is that the packet type is a route search packet, the host obtains information of route between the terminal and the host from the route information data field added to the packet (step 1508), and further, obtains information of route between adjacent terminals from the route information data field (step 1509). When this route has not yet been entered in the database or when there is a route more suitable than the entered route, the host updates the database (step 1510), notifies each terminal of the route information (step 1511), and returns to the reception state (step 1512).

During data communication, since each terminal can obtain, from the host, information of route up to a terminal in the vicinity of the self-terminal, adjacent terminals add information of routes up to the destination terminal to the data packet, and perform communication without using the transfer processing by the host. When performing communication between terminals which are not adjacent to each other, information of a route up to the host is added to the data packet, and the host performs transmission.

As described above, in the communication system according to the fifth embodiment, when performing a route search, the host obtains not only the information of route from each terminal to the host but also the information of route between adjacent terminals, and enters the route information in the data base. When performing data communication between the adjacent terminals, the terminals perform direct communication without intervening the host. Therefore, needless routing is avoided, leading to a reduction in traffic and error.

Embodiment 6

The construction of a communication system according to a sixth embodiment is identical to the communication systems shown in FIGS. 1 to 4.

During route search, each terminal obtains information of route up to a neighboring terminal, and notifies the host of the route information.

Figure 16:
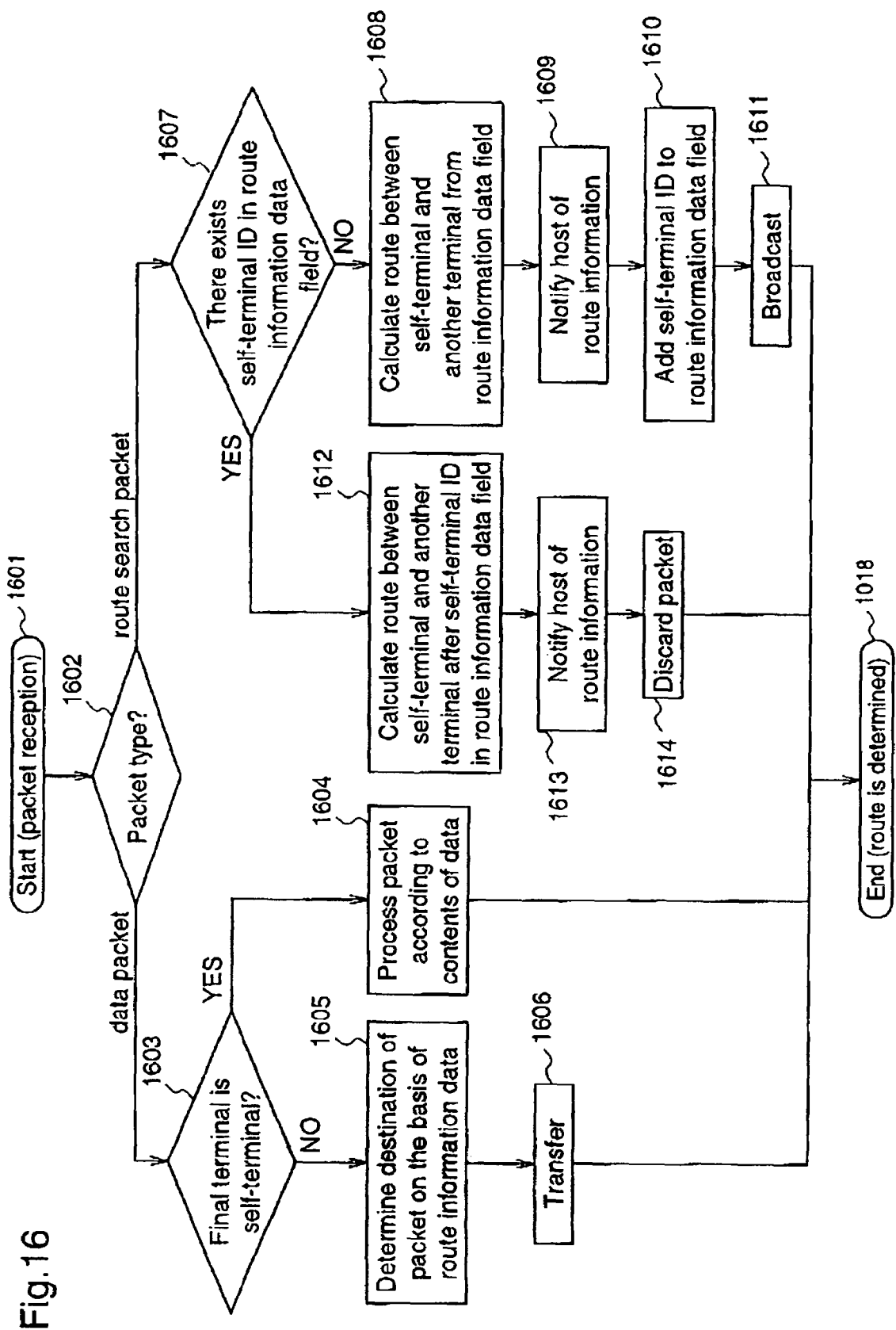
FIG. 16 is a flowchart illustrating packet reception processing by each terminal in a communication system according to a sixth embodiment.

FIG. 16 is a flowchart illustrating the packet reception processing of each terminal in the communication system according to the sixth embodiment.

When a terminal receives a packet (step 1601), it is judged whether the received packet is a route search packet or a data packet (step 1602). At this time, the packet type may be judged according to whether or not the packet is a broadcast packet, or it may be judged from an ID that is added to the packet and indicates the packet type.

When the packet type is a data packet, it is judged whether or not the final terminal is the self-terminal (step 1603). When the final terminal is the self-terminal, processing according to the contents of data is carried out (step 1604) to return to the reception state (step 1615). When the final terminal is another terminal, the ID of the next target terminal is added as a destination ID to the packet on the basis of the route information data added to the packet (step 1605), and transmission is carried out (step 1606) to return to the reception state (step 1615).

When the judgement in step 1602 is that the packet type is a route search packet, it is judged whether or not the ID of the self-terminal has already added to the route information data field of the packet (step 1607). When the ID of the self-terminal has not yet been added to the route information data field of the packet, the information of route between the self-terminal and another terminal is obtained from the route information data field (step 1608), and the route information is informed to the host (step 1609). Further, the ID of the self-terminal is added to the route information data field (step 1610), the packet is broadcast (step 1611) to return to the reception state (step 1615).

When the ID of the self-terminal has already been added to the route information data field of the packet, since the information prior to the ID of the self-terminal has already been checked in the processing performed when the ID of the self-terminal has not been added to the route information data field, the information of route between the self-terminal and another terminal is obtained from the data that follows the ID of the self-terminal (step 1612), the route information is informed to the host (step 1613), and the received packet is discarded to avoid endless route search (step 1614) to return to the reception state (step 1615).

During data communication, since each terminal can obtain, from the host, information of a route up to a terminal in the vicinity of the self-terminal, adjacent terminals add the information of routes up to the destination terminal to the data packet, and perform communication without using transfer by the host. When performing communication between terminals that are not close to each other, information of a route up to the host is added to the data packet, and the host performs transfer.

As described above, in the communication system according to the sixth embodiment, during a route search, each terminal obtains information of route up to a neighboring terminal and informs it to the host. During data communication between the adjacent terminals, the terminals perform direct communication without intervention of the host on the basis of the route information stored in the host. Therefore, it is not necessary for the host to calculate the route information of all terminals, resulting in a reduction in processing load on the host. Further, even when a portion of a route is changed, partial search can be carried out, leading to a reduction in traffic.

What is claimed is:

1. A communication system comprising (i) a plurality of communication terminals, each communication terminal having a relay function, and (ii) a host having a relay function and a route control function, wherein:

during a route search, a communication terminal of said plurality of communication terminals adds an ID of a self-terminal to a route search packet and broadcasts the route search packet over an area where communication is possible;

on receipt of a route search packet, said communication terminal of said plurality of communication terminals adds the ID of the self-terminal to the received route search packet if the ID of the self-terminal has not been added to the received route search packet, and broadcasts the received route search packet over the area where communication is possible;

said host obtains information of a route up to said communication terminal on a basis of the received route search packet, and notifies said communication terminal of the obtained route information;

during data communication, said communication terminal creates route information data on a basis of an ID of a destination terminal and IDs of relay terminals located between the self-terminal and said host, adds the route information data to a data packet, and transmits the data packet to said host;

on receipt of a data packet, said communication terminal transfers the received data packet on a basis of the route information data of the received data packet when a destination terminal of the received data packet is not the self terminal; and said host creates route information data between itself and the destination terminal on a basis of the route information data of the received data packet when the destination terminal of the received data packet is not the self-terminal, adds an ID of the destination terminal and the created route information data to the received data packet, and transfers the received data packet to the destination terminal.

2. A communication system comprising (i) a plurality of communication terminals, each communication terminal having a relay function, and (ii) a host having a relay function and a route control function, wherein:

during a route search, a communication terminal of said plurality of communication terminals adds an ID of a self-terminal to a route search packet and broadcasts the route search packet over an area where communication is possible;

on receipt of a route search packet, said communication terminal of said plurality of communication terminals adds the ID of the self-terminal to the received route search packet if the ID of the self-terminal has not been added to the received route search packet, and broadcasts the received route search packet over the area where communication is possible;

said host obtains information of a route up to said communication terminal on a basis of the received route search packet, and notifies said communication terminal of the obtained route information;

said host creates pattern information of a route having a specific communication terminal as a relay terminal on a basis of the route information obtained during the route search, and notifies each communication terminal of the created pattern information at an arbitrary timing or periodically;

on receipt of a data packet, said host transfers the received data packet on a basis of the pattern information of the received data packet when a destination terminal of the received data packet is not the self-terminal;

said communication terminal adds, to the received data packet, pattern information of a route up to an arbitrary communication terminal, and transmits the received data packet having the pattern information of the route up to the arbitrary communication terminal added thereto; and on receipt of the data packet, said communication terminal transfers the received data packet on a basis of the pattern information of the received data packet when the destination terminal of the data packet is not the self-terminal.

* * * * *